United States Patent
Matsue et al.

(10) Patent No.: US 10,939,006 B2
(45) Date of Patent: Mar. 2, 2021

(54) IMAGE READING DEVICE FOR CONVEYING AND READING CARD LIKE MEDIUM

(71) Applicant: NIDEC SANKYO CORPORATION, Nagano (JP)

(72) Inventors: Teruo Matsue, Nagano (JP); Toshio Tatai, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 16/361,459

(22) Filed: Mar. 22, 2019

(65) Prior Publication Data

US 2019/0306355 A1    Oct. 3, 2019

(30) Foreign Application Priority Data

Mar. 27, 2018    (JP) .............................. JP2018-059195

(51) Int. Cl.
*H04N 1/04* (2006.01)
*H04N 1/00* (2006.01)
*H04N 1/203* (2006.01)

(52) U.S. Cl.
CPC ..... *H04N 1/00602* (2013.01); *H04N 1/00559* (2013.01); *H04N 1/2032* (2013.01)

(58) Field of Classification Search
CPC .......... H04N 1/00602; H04N 1/00559; H04N 1/2032
USPC .................................... 358/1.1, 498
See application file for complete search history.

(56) References Cited

U.S. PATENT DOCUMENTS

2015/0375533 A1* 12/2015 Hobo .................... B41J 11/007
 347/104
2016/0347057 A1* 12/2016 Oikawa ................ B41J 2/04563
2017/0163834 A1*  6/2017 Miyata ............... G03G 15/5012
2020/0324991 A1* 10/2020 Nakamura ............. B65H 9/002

FOREIGN PATENT DOCUMENTS

JP        2014115686 A    6/2014

* cited by examiner

*Primary Examiner* — Douglas Q Tran
(74) *Attorney, Agent, or Firm* — Cantor Colburn LLP

(57) ABSTRACT

An image reading device may include a conveyance path; a conveyance mechanism; and a first image sensor and a second image sensor that are disposed on both sides of the conveyance path. The conveyance mechanism may include a driving source; a pair of first conveyance rollers located upstream of a first and second image read position; and a pair of second conveyance rollers located downstream of the first and second image read position. The pair of first conveyance rollers may include a first drive roller; and a first opposing roller. The pair of second conveyance rollers may include a second drive roller and a second opposing roller.

20 Claims, 5 Drawing Sheets

IMAGE READING DEVICE FOR CONVEYING AND READING CARD LIKE MEDIUM

CROSS REFERENCE TO RELATED APPLICATION

The present application claims priority under 35 U.S.C. § 119 to Japanese Application No. 2018-059195 filed Mar. 27, 2018, the entire content of which is incorporated herein by reference.

BACKGROUND

Field of the Invention

At least an embodiment of the present invention relates to an image reading device that conveys a card-like medium along a conveyance path and reads the front surface and the back surface of the card-like medium.

Description of the Related Documents

Japanese Laid-open Patent Publication No. 2014-115686 discloses an image reading device that reads the surface of a card-like medium, such as a card, used in financial institutions, and the like. The image reading device disclosed in Japanese Laid-open Patent Publication No. 2014-115686 includes: a conveyance path through which a card is conveyed; a conveyance mechanism that conveys a card-like medium along the conveyance path; and an image sensor disposed above the conveyance path with its sensor surface facing the conveyance path. The conveyance mechanism includes: a driving source; a pair of first conveyance rollers located upstream of an image read position of the image sensor in the conveying direction; and a pair of second conveyance rollers located downstream of the image read position in the conveying direction. The pair of first conveyance rollers includes: a first drive roller to which a driving force from the driving source is transmitted; and a first pad roller opposed to the first drive roller with the conveyance path interposed therebetween. The first pad roller is supported such that it is movable in a direction close to and away from the first drive roller and is biased by a first spring member toward the first drive roller. The pair of second conveyance rollers includes: a second drive roller to which a driving force from the driving source is transmitted; and a second pad roller opposed to the second drive roller with the conveyance path interposed therebetween. The second pad roller is supported such that it is movable in a direction close to and away from the second drive roller and is biased by a second spring member toward the second drive roller.

After a card-like medium is inserted into the conveyance path, the image reading device drives the driving source to drive the pair of first conveyance rollers and the pair of second conveyance rollers. The card-like medium is delivered to the image read position while it is nipped by the pair of first conveyance rollers and is passed through the image read position. The image sensor reads the surface of the card-like medium passing through the image read position and acquires image data. When the leading end of the card-like medium reaches the downstream side of the image read position, the card-like medium is nipped by the pair of second conveyance rollers and is conveyed until its trailing end passes through the image read position.

A drive roller in the pair of conveyance rollers conveying a card-like medium includes a conveyance-roller main body that is made of an elastic material such as rubber. On the other hand, an opposing roller (pad roller) opposed to the drive roller includes an opposing-roller main body that is made of a resin material, or the like. When a card-like medium is nipped and conveyed by the pair of conveyance rollers, the conveyance-roller main body is elastically deformed due to the biasing force of a spring member, which biases the opposing roller, in a direction away from the opposing-roller main body.

Here, the deformation amount of the deformed conveyance-roller main body is hardly relevant to the thickness of a card-like medium, and it depends on the biasing force of the spring member for the opposing roller and the material (the degree of hardness) or the shape of the conveyance-roller main body. That is, a change in the thickness of a card-like medium does not cause a change in the deformation amount of the conveyance-roller main body; thus, the position of the surface of the card-like medium at the side of the conveyance roller is not changed. On the other hand, the position of the opposing roller changes in accordance with the thickness of a card-like medium in a direction close to and away from the conveyance path. Specifically, a change in the thickness of the conveyed card-like medium causes a change in the position of the surface of the card-like medium at the side of the opposing roller in a direction perpendicular to the conveying direction; thus, the position of the opposing roller abutting the card-like medium also changes.

As for image reading devices, there is a need to acquire front-surface image data and back-surface image data by reading both the front surface and the back surface of a card-like medium for some use applications. To meet such a need, it is possible to dispose a first image sensor and a second image sensor on two sides with a conveyance path interposed therebetween in an image reading device. In this case, a pair of first conveyance rollers is located upstream of a first image read position of the first image sensor and a second image read position of the second image sensor in the conveying direction, and a pair of second conveyance rollers is located downstream of the first image read position and the second image read position in the conveying direction. Furthermore, the first image sensor reads the front surface of the card-like medium conveyed through the first image read position, and the second image sensor reads the back surface of the card-like medium conveyed through the second image read position.

When a pair of conventional conveyance rollers conveys a card-like medium, however, a change in the thickness of the card-like medium causes a change in the position of the surface of the card-like medium at the side of the opposing roller in a direction perpendicular to the conveying direction. As a result, a problem arises, that is, a change in the distance between one image sensor located at the side of the opposing roller out of the first image sensor and the second image sensor and the surface (the target surface to be read) of the card-like medium at the side of the opposing roller. Here, if the distance between one of the image sensors and the target surface of the card-like medium to be read changes due to the thickness of the target card-like medium to be read and it exceeds the depth of field of the image sensor, the image sensor misses the point on the target surface to be read, and the accuracy with which the image sensor reads images is decreased.

In consideration of the above problem, the object of at least an embodiment of the present invention is to provide an image reading device configured to accurately read both sides of multiple types of card-like media having a different thickness by using two image sensors disposed on both sides of a conveyance path.

SUMMARY

To solve the above-described problem, the image reading device according to at least an embodiment of the present invention includes: a conveyance path through which a card-like medium is conveyed; a conveyance mechanism configured to convey the card-like medium along the conveyance path; and a first image sensor and a second image sensor that are disposed on both sides with the conveyance path interposed therebetween, wherein the conveyance mechanism includes: a driving source; a pair of first conveyance rollers located upstream of a first image read position of the first image sensor and a second image read position of the second image sensor in a conveying direction; and a pair of second conveyance rollers located downstream of the first image read position and the second image read position in the conveying direction, the pair of first conveyance rollers includes: a first drive roller to which a driving force from the driving source is transmitted; and a first opposing roller that is opposed to the first drive roller with the conveyance path interposed therebetween, the pair of second conveyance rollers includes: a second drive roller to which a driving force from the driving source is transmitted; and a second opposing roller opposed to the second drive roller with the conveyance path interposed therebetween, the first drive roller includes a first drive-roller main body made of an elastic material, the first opposing roller includes a first opposing-roller main body made of an elastic material and configured to nip the card-like medium together with the first drive-roller main body, the second drive roller includes a second drive-roller main body made of an elastic material, the second opposing roller includes a second opposing-roller main body made of an elastic material and configured to nip the card-like medium together with the second drive-roller main body, when the card-like medium is nipped by the pair of first conveyance rollers, a first drive-roller deformation amount of the first drive-roller main body being elastically deformed in a direction away from the first opposing-roller main body is equal to a first opposing-roller deformation amount of the first opposing-roller main body being deformed in a direction away from the first drive-roller main body, and when the card-like medium is nipped by the pair of second conveyance rollers, a second drive-roller deformation amount of the second drive-roller main body being elastically deformed in a direction away from the second opposing-roller main body is equal to a second opposing-roller deformation amount of the second opposing-roller main body being deformed in a direction away from the second drive-roller main body.

According to at least an embodiment of the present invention, in each pair of conveyance rollers, both the drive-roller main body of the drive roller and the opposing-roller main body of the opposing roller are made of an elastic material. Furthermore, when each pair of conveyance rollers nips the card-like medium, the drive-roller main body and the opposing-roller main body are deformed in a direction away from each other by the same deformation amount. Therefore, when the pair of conveyance rollers conveys the card-like medium through the first image read position and the second image read position, both the drive-roller main body and the opposing-roller main body, located at both sides of the conveyance path, are deformed by the same deformation amount. This prevents the center, in the thickness direction, of the card-like medium from moving in the thickness direction of the card-like medium due to the thickness of the conveyed card-like medium. Thus, when a card-like medium having a thickness more than a predetermined thickness is conveyed by the pair of conveyance rollers, a change in the distance between each image sensor and the card-like medium is suppressed to half the difference between the thickness of the target card-like medium to be read and the predetermined thickness. Furthermore, when a card-like medium having a thickness less than the predetermined thickness is conveyed by the pair of conveyance rollers, a change in the distance between each of the image sensors and the card-like medium is suppressed to half the difference between the thickness of the target card-like medium to be read and the predetermined thickness. As a result, even when the distance between each of the image sensors and the card-like medium changes due to the thickness of the card-like medium, it is possible to avoid or prevent the distance from being more than the depth of field (range of focus) of each image sensor. Hence, a decrease in the accuracy with which each of the image sensors reads images may be avoided or reduced.

Furthermore, according to at least an embodiment of the present invention, the center, in the thickness direction, of the card-like medium is not moved in the thickness direction of the card-like medium due to the thickness of the conveyed card-like medium; thus, the distance between the card-like medium and each of the first image sensor and the second image sensor may be substantially equal. Thus, a difference in the image quality between image data on one surface of the card-like medium acquired by the first image sensor and image data on the other surface of the card-like medium acquired by the second image sensor is preventable. Furthermore, according to at least an embodiment of the present invention, in the pair of first conveyance rollers and the pair of second conveyance rollers, both the drive-roller main body and the opposing-roller main body, disposed on both sides of the conveyance path, are deformed by the same deformation amount. Therefore, even though a relatively thin card-like medium is conveyed, the card-like medium is conveyable, in a flat state, through each image sensor without being distorted or bent with curves along the drive-roller main body and the opposing-roller main body. Thus, the distance from each of the first image sensor and the second image sensor to the card-like medium may be substantially equal. Hence, a difference in the image quality between image data on one surface of the card-like medium acquired by the first image sensor and image data on the other surface of the card-like medium acquired by the second image sensor is preventable.

According to at least an embodiment of the present invention, a degree of hardness of the first drive-roller main body is equal to a degree of hardness of the first opposing-roller main body and a shape of the first drive-roller main body is identical to a shape of the first opposing-roller main body. This easily makes, when the pair of first conveyance rollers nips the card-like medium, the first drive-roller deformation amount of the first drive-roller main body being elastically deformed in a direction away from the first opposing-roller main body equal to the first opposing-roller deformation amount of the first opposing-roller main body being deformed in a direction away from the first drive-roller main body. This makes it possible to form the first drive-roller main body and the first opposing-roller main body with the same material; thus, sharing of materials is possible, and it is economic. Furthermore, it is possible to share molds, jigs, and the like, used to manufacture the first drive-roller main body and the first opposing-roller main body.

According to at least an embodiment of the present invention, a degree of hardness of the second drive-roller main body is equal to a degree of hardness of the second opposing-roller main body and a shape of the second drive-roller main body is identical to a shape of the second opposing-roller main body. This easily makes, when the pair of second conveyance rollers nips the card-like medium, the second drive-roller deformation amount of the second drive-roller main body being elastically deformed in a direction away from the second opposing-roller main body equal to the second opposing-roller deformation amount of the second opposing-roller main body being deformed in a direction away from the second drive-roller main body. This makes it possible to form the second drive-roller main body and the second opposing-roller main body with the same material; thus, sharing of materials is possible, and it is economic. Furthermore, it is possible to share molds, jigs, and the like, used to manufacture the second drive-roller main body and the second opposing-roller main body.

According to at least an embodiment of the present invention, a surface of the first drive-roller main body and a surface of the first opposing-roller main body are provided with unevenness. This allows the pair of first conveyance rollers to convey the card-like medium without slip.

According to at least an embodiment of the present invention, a frame is provided, the first drive roller includes a first drive shaft around which the first drive-roller main body is coaxially secured, the first opposing roller includes a first rotary shaft around which the first opposing-roller main body is coaxially secured and which is disposed on an opposite side of the first drive shaft with the conveyance path interposed therebetween, the second drive roller includes a second drive shaft around which the second drive-roller main body is coaxially secured, the second opposing roller includes a second rotary shaft around which the second opposing-roller main body is coaxially secured and which is disposed on an opposite side of the second drive shaft with the conveyance path interposed therebetween, and the first drive shaft, the first rotary shaft, the second drive shaft, and the second rotary shaft are rotatably supported by the frame. This makes it possible to, with a simple configuration, accurately define the position through which the card-like medium is passed.

According to at least an embodiment of the present invention, the conveyance mechanism includes: a first drive-roller moving mechanism that supports the first drive roller such that the first drive roller is movable in a direction close to and away from the conveyance path; a first drive-roller spring member that biases the first drive roller supported by the first drive-roller moving mechanism toward the conveyance path; a first opposing-roller moving mechanism that supports the first opposing roller such that the first opposing roller is movable in a direction close to and away from the conveyance path; and a first opposing-roller spring member that biases the first opposing roller supported by the first opposing-roller moving mechanism toward the conveyance path, and when the card-like medium is not nipped, the first drive-roller main body and the first opposing-roller main body may be kept in contact due to a biasing force of the first drive-roller spring member and a biasing force of the first opposing-roller spring member. This allows both the first drive roller and the first opposing roller to move in a direction away from the conveyance path when the pair of first conveyance rollers delivers the card-like medium to the first image read position and the second image read position. Therefore, it is easy to avoid or control the movement of the center, in the thickness direction, of the card-like medium in the thickness direction of the card-like medium depending on the thickness of the conveyed card-like medium when the card-like medium is conveyed by the pair of first conveyance rollers. Furthermore, the force for nipping the card-like medium between the first drive roller and the first opposing roller, i.e., the conveying force of the pair of first conveyance rollers, is adjustable by the first drive-roller spring member and the first opposing-roller spring member.

The first drive-roller spring member and the first opposing-roller spring member may be of an identical material. This allows the first drive roller and the first opposing roller to move in the direction away from each other by the same movement amount when the pair of first conveyance rollers delivers the card-like medium to the first image read position and the second image read position. This easily prevents the center, in the thickness direction, of the card-like medium from moving in the thickness direction of the card-like medium depending on the thickness of the conveyed card-like medium.

According to at least an embodiment of the present invention, the conveyance mechanism includes a first drive-roller biasing-force adjusting mechanism that is configured to adjust a biasing force of the first drive-roller spring member and a first opposing-roller biasing-force adjusting mechanism that configured to adjust a biasing force of the first opposing-roller spring member. This makes it possible to adjust the biasing force of the first drive-roller spring member and the biasing force of the first opposing-roller spring member in accordance with the thickness of the card-like medium inserted into the conveyance path; thus, the force for nipping the card-like medium between the first drive roller and the first opposing roller is adjustable. Thus, the force for nipping the card-like medium between the first drive roller and the first opposing roller, i.e., the conveying force of the pair of first conveyance rollers, is adjustable in accordance with the thickness of the card-like medium inserted into the conveyance path.

According to at least an embodiment of the present invention, the conveyance mechanism includes: a second drive-roller moving mechanism that supports the second drive roller such that the second drive roller is movable in a direction close to and away from the conveyance path; a second drive-roller spring member that biases the second drive roller supported by the second drive-roller moving mechanism toward the conveyance path; a second opposing-roller moving mechanism that supports the second opposing roller such that the second opposing roller is movable in a direction close to and away from the conveyance path; and a second opposing-roller spring member that biases the second opposing roller supported by the second opposing-roller moving mechanism toward the conveyance path, and when the card-like medium is not nipped, the second drive-roller main body and the second opposing-roller main body may be kept in contact due to a biasing force of the second drive-roller spring member and a biasing force of the second opposing-roller spring member. This makes it possible to move both the second drive-roller main body and the second opposing-roller main body in a direction away from the conveyance path when the pair of second conveyance rollers conveys the card-like medium through the first image read position and the second image read position. Therefore, it is easy to avoid or control the movement of the center, in the thickness direction, of the card-like medium in the thickness direction of the card-like medium depending on the thickness of the conveyed card-like medium when the card-like medium is conveyed by the pair of second conveyance rollers. Furthermore, the force for nipping the card-like medium between the second drive roller and the second opposing roller, i.e., the conveying force of the pair of second conveyance rollers, is adjustable by the second drive-roller spring member and the second opposing-roller spring member.

According to at least an embodiment of the present invention, the second drive-roller spring member and the second opposing-roller spring member are of an identical material. This allows the second drive roller and the second opposing roller to move in the direction away from each other by the same movement amount when the pair of second conveyance rollers delivers the card-like medium to the first image read position and the second image read position. This easily prevents the center, in the thickness direction, of the card-like medium from moving in the thickness direction of the card-like medium depending on the thickness of the conveyed card-like medium.

According to at least an embodiment of the present invention, the conveyance mechanism may include a second drive-roller biasing-force adjusting mechanism that is configured to adjust a biasing force of the second drive-roller spring member and a second opposing-roller biasing-force adjusting mechanism that is configured to adjust a biasing force of the second opposing-roller spring member. This makes it possible to adjust the force for nipping the card-like medium between the second drive roller and the second opposing roller in accordance with the thickness of the card-like medium inserted into the conveyance path.

According to at least an embodiment of the present invention, a state is obtained such that both the conveyance-roller main body and the opposing-roller main body, located on both sides of the conveyance path, are deformed by the same deformation amount when each pair of conveyance rollers delivers the card-like medium to the first image read position and the second image read position. This prevents the center, in the thickness direction, of the card-like medium from moving in the thickness direction of the card-like medium due to the thickness of the conveyed card-like medium when the card-like medium is conveyed by each pair of conveyance rollers along the conveyance path. Therefore, changes in the positions of the front and back surfaces of the card-like medium are preventable even when the thickness of the card-like medium is changed. Thus, it is possible to accurately read the front and back surfaces of multiple types of card-like media having a different thickness by using two image sensors disposed on both sides of the conveyance path.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION (Image Scanner)

Figure 1:
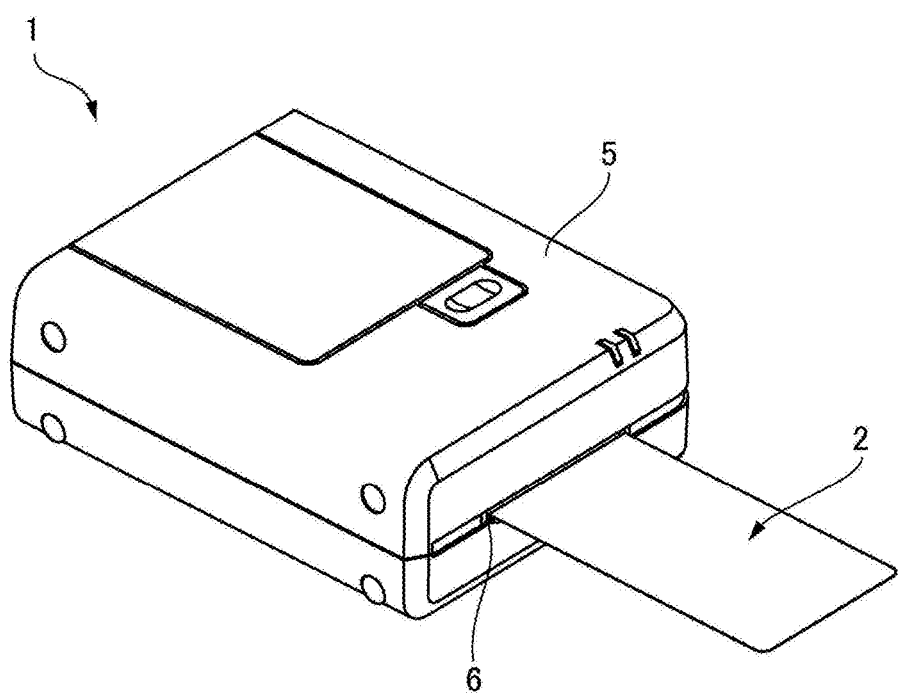
FIG. 1 is an external perspective view of an image reading device to which at least an embodiment of the present invention is applied.
Figure 1:
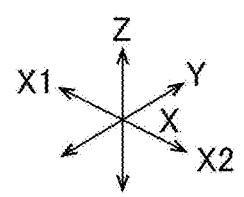
Figure 2:
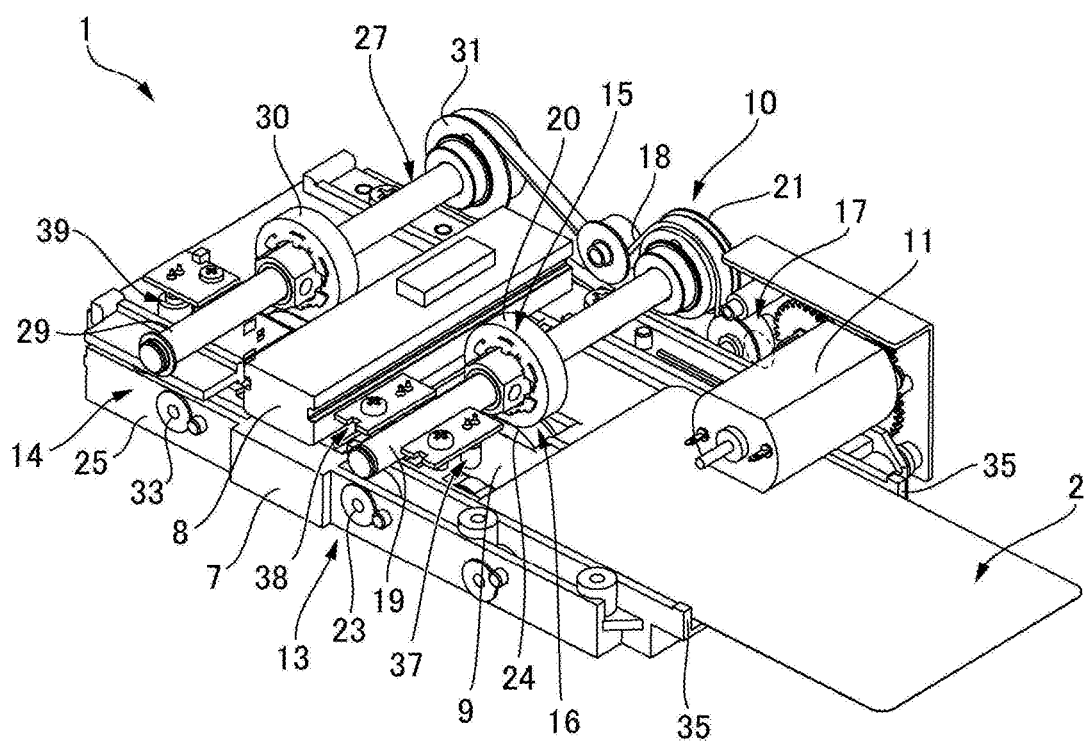
FIG. 2 is a perspective view of the image reading device from which an outer chassis has been removed.
Figure 3:
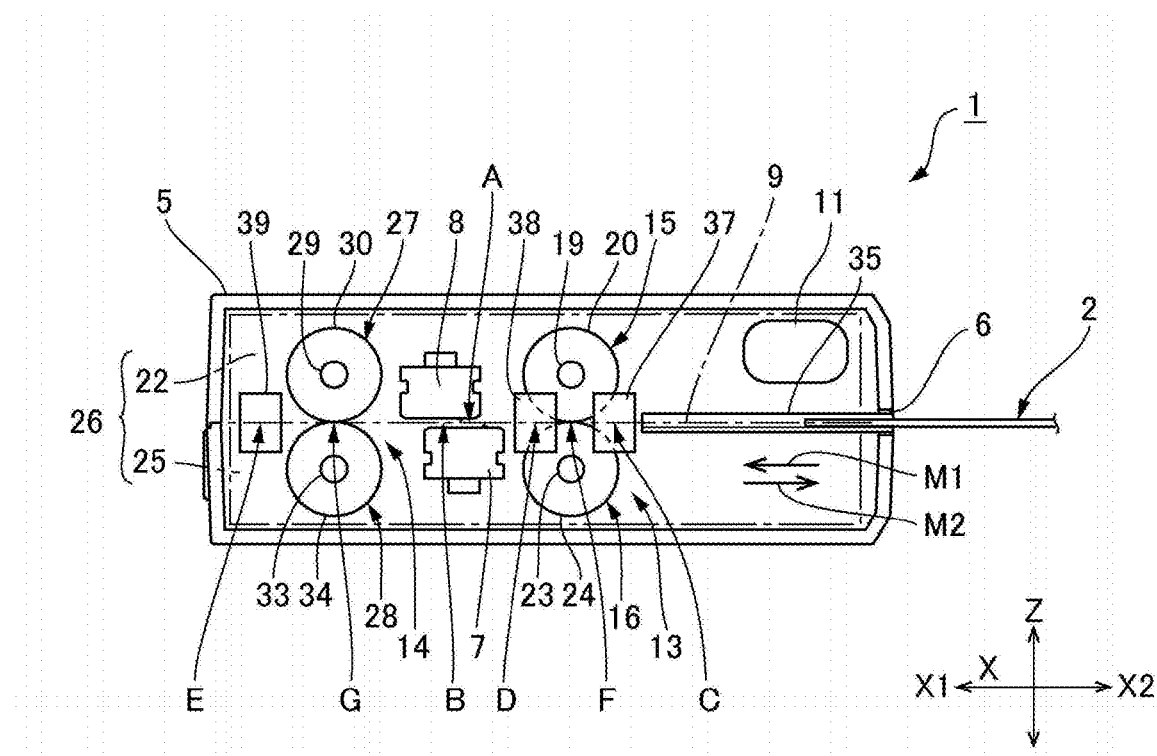
FIG. 3 is a longitudinal sectional view of the image reading device.
Figure 4:
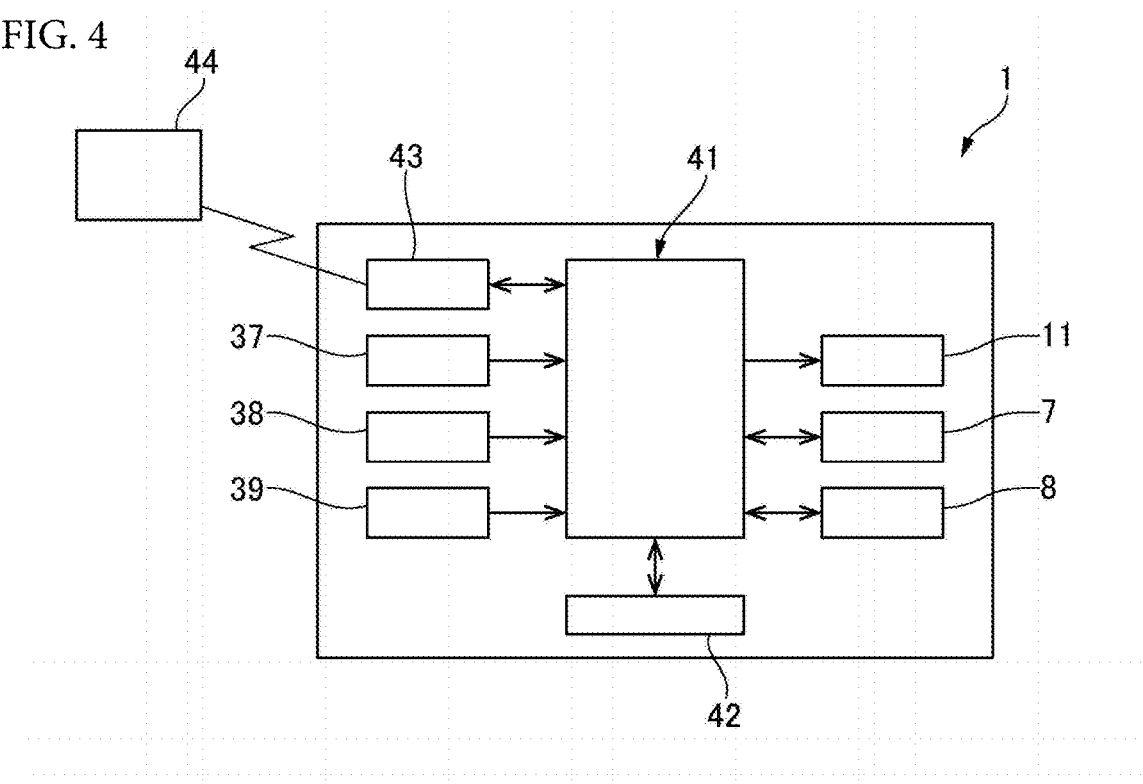
FIG. 4 is a schematic block diagram of a control system of the image reading device.

FIG. 1 is an external perspective view of an image scanner to which at least an embodiment of the present invention is applied. FIG. 2 is a perspective view of the image scanner from which an outer chassis has been removed. FIG. 3 is a longitudinal sectional view of the image scanner. FIG. 4 is a schematic block diagram showing the control system of the image scanner. A scanner 1 (image reading device) according to the present embodiment reads the front surface and the back surface of multiple types of card-like media 2 having the same length dimension and width dimension as those of ISO standard ID-1 credit cards, or the like, and having different thickness dimensions.

As illustrated in FIG. 1, the scanner 1 includes a cuboidal chassis 5; and a slot 6 provided at the rear surface of the chassis 5. As illustrated in FIG. 2, a first image sensor 7, a second image sensor 8, a conveyance path 9 through which the card-like medium 2 is conveyed, and a conveyance mechanism 10 conveying the card-like medium 2 along the conveyance path 9 are provided inside the chassis 5.

The first image sensor 7 and the second image sensor 8 are disposed on both sides with the conveyance path 9 interposed therebetween in a vertical direction. As illustrated in FIG. 3, the conveyance path 9 linearly extends from the slot 6 through a first image read position A of the first image sensor 7 and a second image read position B of the second image sensor 8 in this order. In the following explanation, the extending direction of the conveyance path 9 is a front-back direction X of the scanner 1. The perpendicular direction that is perpendicular to a vertical direction Z and the front-back direction X is a width direction Y of the scanner 1. As for the front-back direction X, the side to which the conveyance path 9 extends from the slot 6 is a front side X1, and the opposite side, i.e., the side at which the slot 6 is disposed is a rear side X2. Furthermore, as for the front-back direction X, the direction to which the conveyance mechanism 10 conveys the card-like medium 2 during image reading (the direction toward the front side X1 from the slot 6) is a conveying direction M1, and its opposite direction is a discharging direction M2.

Each of the first image sensor 7 and the second image sensor 8 is a line image sensor. Each of the first image sensor 7 and the second image sensor 8 is disposed in such a posture that it crosses the conveyance path 9 in the width direction Y. The first image sensor 7 is located under the conveyance path 9 and its sensor surface faces the conveyance path 9 (upward). The second image sensor 8 is located above the conveyance path 9, and its sensor surface faces the conveyance path 9 (downward). The first image sensor 7 reads the back surface (lower surface) of the card-like medium 2 passing through the first image read position A, and the second image sensor 8 reads the front surface (upper surface) of the card-like medium 2 passing through the second image read position B.

Each of the first image sensor 7 and the second image sensor 8 is configured to read images with visible light, infrared light, and ultraviolet light. Specifically, each of the first image sensor 7 and the second image sensor 8 selectively or sequentially emits visible light, infrared light, or ultraviolet light, as image reading light, to the card-like medium 2 conveyed through the conveyance path 9, thereby acquiring a visible light image, infrared light image, or ultraviolet light image.

As illustrated in FIG. 2, the conveyance mechanism 10 includes a conveyance motor 11 as a driving source. The conveyance mechanism 10 further includes a pair of first conveyance rollers 13 disposed at the rear side X2 (the upstream side in the conveying direction M1) of the first image sensor 7 and the second image sensor 8 and a pair of second conveyance rollers 14 disposed at the front side X1.

The pair of first conveyance rollers 13 includes: a first drive roller 15 located above the conveyance path 9; and a first driven roller 16 (first opposing roller) located under the conveyance path 9. Rotation of the conveyance motor 11 is transmitted to the first drive roller 15 via a driving-force transmission mechanism 17. The driving-force transmission mechanism 17 includes a belt 18.

The first drive roller 15 includes: a first drive shaft 19 extending in the width direction Y; a first drive-roller main body 20 fixed at the central part of the drive shaft in the width direction Y; and a first pulley 21 provided at one end of the first drive shaft 19 in the width direction Y. The first drive shaft 19 is rotatably supported by an upper frame 22 (see FIG. 3). The first drive-roller main body 20 is made of an elastic material such as rubber. Rotation of the conveyance motor 11 is transmitted to the first pulley 21 via the belt 18.

The first driven roller 16 includes: a first rotary shaft 23 extending in the width direction Y; and a first driven-roller main body 24 (first opposing-roller main body) fixed at the central part of the first rotary shaft 23 in the width direction Y. The first rotary shaft 23 is rotatably supported by a lower frame 25. The first driven-roller main body 24 is made of the same elastic material as that of the first drive-roller main body 20. Therefore, the degree of hardness of the first drive-roller main body 20 and the first driven-roller main body 24 is equal. Furthermore, the first driven-roller main body 24 has the same shape as that of the first drive-roller main body 20. Therefore, when the pair of first conveyance rollers 13 nips the card-like medium 2, the first drive-roller deformation amount of the first drive-roller main body 20 being elastically deformed in a direction away from the first driven-roller main body 24 is equal to the first driven-roller deformation amount (first opposing-roller deformation amount) of the first driven-roller main body 24 being deformed in a direction away from the first drive-roller main body 20. Moreover, the upper frame 22 is fixed above the lower frame 25, and the upper frame 22 and the lower frame 25 constitute a frame 26.

The pair of second conveyance rollers 14 includes: a second drive roller 27 located above the conveyance path 9; and a second driven roller 28 (second opposing roller) located under the conveyance path 9. Rotation of the conveyance motor 11 is transmitted to the second drive roller 27 via the driving-force transmission mechanism 17. The second drive roller 27 includes: a second drive shaft 29 extending in the width direction Y; a second drive-roller main body 30 (second opposing-roller main body) fixed at the central part of the second drive shaft 29 in the width direction Y; and a second pulley 31 provided at one end of the second drive shaft 29 in the width direction Y. The second drive shaft 29 is rotatably supported by the upper frame 22. The second drive-roller main body 30 is made of an elastic material such as rubber. Rotation of the conveyance motor 11 is transmitted to the second pulley 31 via the belt of the driving-force transmission mechanism 17.

As illustrated in FIG. 3, the second driven roller 28 includes: a second rotary shaft 33 extending in the width direction Y; and a second driven-roller main body 34 fixed at the central part of the second rotary shaft 33 in the width direction Y. The second rotary shaft 33 is rotatably supported by the lower frame 25. The second driven-roller main body 34 is made of the same elastic material as that of the second drive-roller main body 30. Therefore, the degrees of hardness of the second drive-roller main body 30 and the second driven-roller main body 34 are equal. Furthermore, the second driven-roller main body 34 has the same shape as that of the second drive-roller main body 30. Therefore, when the pair of second conveyance rollers 14 nips the card-like medium 2, the second drive-roller deformation amount of the second drive-roller main body 30 being elastically deformed in a direction away from the second driven-roller main body 34 is equal to the second driven-roller deformation amount (second opposing-roller deformation amount) of the second driven-roller main body 34 being deformed in a direction away from the second drive-roller main body 30.

Here, the dimension of the conveyance path 9 in an orthogonal direction is substantially the same as the width dimension of the card-like medium 2. As illustrated in FIG. 2, conveyance guide sections 35 controlling and guiding the card-like medium 2 for linear conveying are provided on both sides of the lower frame 25 in a direction perpendicular to the conveyance path 9.

Furthermore, the scanner 1 includes a first position sensor 37, a second position sensor 38, and a third position sensor 39 to detect the card-like medium 2 located on the conveyance path 9. The first position sensor 37 is positioned on the rear side X2 of the first drive shaft 19. That is, a first detection position C of the first position sensor 37 is located upstream of a first nip position F of the card-like medium 2 by the pair of first conveyance rollers 13 in the conveying direction M1. The second position sensor 38 is positioned between the first drive shaft 19 and the first image sensor 7. Specifically, a second detection position D of the second position sensor 38 is located upstream of the first image read position A of the first image sensor 7 in the conveying direction M1 and is located downstream of the first nip position F. The third position sensor 39 is positioned on the front side X1 of the second drive shaft 29. Specifically, a third detection position E of the third position sensor 39 is located downstream of the second image read position B of the second image sensor 8 and a second nip position G of the pair of second conveyance rollers 14 in the conveying direction M1.

Each of the first position sensor 37, the second position sensor 38, and the third position sensor 39 is a transmissive photosensor. Each of the first position sensor 37, the second position sensor 38, and the third position sensor 39 includes: a light emitting unit that emits examination light; and a light receiving unit that receives examination light. The light emitting unit and the light receiving unit are installed with the conveyance path 9 interposed therebetween in a vertical direction. When the card-like medium 2 is conveyed along the conveyance path 9 and is passed through the detection position of each sensor so that the examination light is blocked by the card-like medium 2, each of the first position sensor 37, the second position sensor 38, and the third position sensor 39 outputs signals indicating that the card-like medium 2 has been detected.

More specifically, when the front end of the card-like medium 2 is passed through the respective detection positions C, D, and E of the first position sensor 37, the second position sensor 38, and the third position sensor 39, examination light from each of the position sensors 37, 38, and 39 is changed from the on state to the off state, and a signal indicating that the card-like medium 2 has been detected is output. Furthermore, after the card-like medium 2 is conveyed and the rear end of the card-like medium 2 is passed through the respective detection positions C, D, and E of the first position sensor 37, the second position sensor 38, and the third position sensor 39, light detected by each of the position sensors 37, 38, and 39 is changed from the off state to the on state, and a signal indicating that the card-like medium 2 has been passed through each of the detection positions C, D, and E is output.

Furthermore, the scanner 1 includes a control unit 41. As illustrated in FIG. 4, the first position sensor 37, the second position sensor 38, and the third position sensor 39 are coupled to the input side of the control unit 41. The conveyance motor 11 is coupled to the output side of the control unit 41. Moreover, the first image sensor 7, the second image sensor 8, and a memory 42 are coupled to the control unit 41. Furthermore, the control unit 41 is coupled to a higher-level device 44 via a communication interface 43.

The control unit 41 controls driving of the conveyance motor 11, the first image sensor 7, and the second image sensor 8 based on output from the first position sensor 37 and the second position sensor 38 and acquires front-surface image data on the front surface image by reading the front surface of the card-like medium 2 and back-surface image data on the back surface image by reading the back surface. Furthermore, the control unit 41 stores acquired front-surface image data and back-surface image data in the memory 42. Furthermore, the control unit 41 transmits appropriate image data in front-surface image data and back-surface image data stored in the memory 42 to the higher-level device 44 in accordance with a command from the higher-level device 44.

(Image Reading Operation)

When the card-like medium 2 is inserted into the conveyance path 9 through the slot 6 and reaches the first detection position C, the front end of the card-like medium 2 blocks examination light from the first position sensor 37. This causes the first position sensor 37 to output a signal indicating that the card-like medium 2 has been detected, and then the control unit 41 drives the conveyance motor 11. Accordingly, the pair of first conveyance rollers 13 and the pair of second conveyance rollers 14 are rotated so that the card-like medium 2 is conveyed along the conveyance path 9 in the conveying direction M1 (the front side X1).

Here, as for the pair of first conveyance rollers 13, both the first drive-roller main body 20 of the first drive roller 15 and the first driven-roller main body 24 of the first driven roller 16 are made of an elastic material. Furthermore, as the first drive-roller main body 20 and the first driven-roller main body 24 have the same degree of hardness and shape, the deformation amounts (the first drive-roller deformation amount and the first driven-roller deformation amount) of their deformations in a direction away from the conveyance path 9 are equal when the pair of first conveyance rollers 13 nips the card-like medium 2. Therefore, when the card-like medium 2 is conveyed by the pair of first conveyance rollers 13, the center of the card-like medium 2 in its thickness direction passes through the center between the first drive shaft 19 and the first rotary shaft 23 (the conveyance path 9, the center between the first image sensor 7 and the second image sensor 8).

Then, when the card-like medium 2 reaches the second detection position D, the front end of the conveyed card-like medium 2 blocks examination light from the second position sensor 38. This causes the second position sensor 38 to output a signal indicating that the card-like medium 2 has been detected, and therefore the control unit 41 controls driving of the first image sensor 7 and the second image sensor 8 so as to read the front surface and the back surface of the conveyed card-like medium 2. During reading of the card-like medium 2, each of the first image sensor 7 and the second image sensor 8 emits image reading light to the card-like medium 2 conveyed through each of the image read positions (the first image read position A and the second image read position B) in only a predetermined reading time to acquire front-surface image data and back-surface image data. The reading time is a sufficient time for the card-like medium 2 to pass through the first image read position A and the second image read position B. Furthermore, the control unit 41 stores front-surface image data and back-surface image data acquired by the first image sensor 7 and the second image sensor 8 in the memory 42. Moreover, the control unit 41 transmits appropriate image data in front-surface image data and back-surface image data stored in the memory 42 to the higher-level device 44 in accordance with a command from the higher-level device 44.

Furthermore, according to the present embodiment, the card-like medium 2 reaches the second nip position G while the first image sensor 7 and the second image sensor 8 read the front surface and the back surface. After the card-like medium 2 reaches the second nip position G, the pair of second conveyance rollers 14 nips the card-like medium 2 and conveys the card-like medium 2 together with the pair of first conveyance rollers 13. Then, after the card-like medium 2 has passed through the first nip position F, only the pair of second conveyance rollers 14 conveys the card-like medium 2.

Here, as for the pair of second conveyance rollers 14, both the second drive-roller main body 30 of the second drive roller 27 and the second driven-roller main body 34 of the second driven roller 28 are made of an elastic material. Furthermore, the second drive-roller main body 30 and the second driven-roller main body 34 have the same degree of hardness and shape, and the deformation amounts of their deformations in a direction away from the conveyance path 9 are equal when the pair of second conveyance rollers 14 nips the card-like medium 2. Therefore, when the card-like medium 2 is conveyed, the center, in the thickness direction, of the card-like medium 2 passes through the center between the second drive shaft 29 and the second rotary shaft 33.

Then, the control unit 41 stops the conveyance motor 11 when a predetermined conveyance time elapses after the conveyance motor 11 is driven. Afterward, the control unit 41 drives the conveyance motor 11 in the opposite direction. This causes the scanner 1 to convey the card-like medium 2 in the discharging direction M2 (the rear side X2) and discharges it through the slot 6. Here, the predetermined conveyance time is a time in which the rear end of the card-like medium 2 in the conveying direction M1 may pass the second image read position B of the second image sensor 8 due to driving of the conveyance motor 11. Here, when the control unit 41 stops the conveyance motor 11 and drives it in the opposite direction, the third position sensor 39 detects the card-like medium 2 at the third detection position E. Therefore, the control unit 41 confirms that the card-like medium 2 is on the conveyance path 9 based on an output from the third position sensor 39.

(Functional Advantage)

According to the present embodiment, the center, in the thickness direction, of the card-like medium 2 conveyed by the pair of first conveyance rollers 13 is not moved in the thickness direction of the card-like medium 2 due to the thickness of the conveyed card-like medium 2. Therefore, for example, when the card-like medium 2 having a thickness more than a predetermined thickness is conveyed by the pair of first conveyance rollers 13, a change in the distance between the card-like medium 2 and each of the image sensors 7, 8 is suppressed to half the difference between the thickness of the target card-like medium 2 to be read and the predetermined thickness. Furthermore, for example, when the card-like medium 2 having a thickness less than the predetermined thickness is conveyed by the pair of first conveyance rollers 13, a change in the distance between the card-like medium 2 and each of the image sensors 7, 8 is suppressed to half the difference between the thickness of the target card-like medium 2 to be read and the predetermined thickness. Thus, even when the distance between the card-like medium 2 and each of the image sensors 7, 8 changes due to the thickness of the card-like medium 2, it is possible to avoid or prevent the distance from being more than the depth of field (range of focus) of each of the image sensors 7, 8. Hence, a decrease in the accuracy with which each of the image sensors 7, 8 reads images may be avoided or controlled.

In the same manner, the center, in the thickness direction, of the card-like medium 2 conveyed by the pair of second conveyance rollers 14 is not moved in the thickness direction of the card-like medium 2 due to the thickness of the conveyed card-like medium 2. Therefore, for example, when the card-like medium 2 having a thickness more than a predetermined thickness is conveyed by the pair of second conveyance rollers 14, a change in the distance between the card-like medium 2 and each of the image sensors 7, 8 is suppressed to half the difference between the thickness of the target card-like medium 2 to be read and the predetermined thickness. Furthermore, for example, when the card-like medium 2 having a thickness less than the predetermined thickness is conveyed by the pair of second conveyance rollers 14, a change in the distance between the card-like medium 2 and each of the image sensors 7, 8 is suppressed to half the difference between the thickness of the target card-like medium 2 to be read and the predetermined thickness. Thus, even when the distance between the card-like medium 2 and each of the image sensors 7, 8 changes due to the thickness of the card-like medium 2, it is possible to avoid or control the distance from being more than the depth of field (range of focus) of each of the image sensors 7, 8. Hence, a decrease in the accuracy with which each of the image sensors 7, 8 reads images may be avoided or controlled.

Furthermore, according to the present embodiment, the center, in the thickness direction, of the card-like medium 2 conveyed by the pair of first conveyance rollers 13 is not moved in the thickness direction of the card-like medium 2 due to the thickness of the conveyed card-like medium 2. This allows for the substantially equal distance between the card-like medium 2 and each of the first image sensor 7 and the second image sensor 8; thus, a difference in the image quality between front-surface image data and back-surface image data is preventable. Furthermore, according to the present embodiment, the deformation amounts of the first drive-roller main body 20 and the first driven-roller main body 24 deformed in a direction away from the conveyance path 9 are equal, and the deformation amounts of the second drive-roller main body 30 and the second driven-roller main body 34 deformed in a direction away from the conveyance path 9 are equal. Therefore, even though the card-like medium 2 is relatively thin, the card-like medium 2 is conveyable, in a flat state, to the image sensors 7 and 8 without being distorted or bent with curves in the vertical direction Z along the shapes of the first drive-roller main body 20, the first driven-roller main body 24, the second drive-roller main body 30, and the second driven-roller main body 34. Thus, a difference in the image quality between front-surface image data and back-surface image data is preventable.

Here, according to the present embodiment, the first drive shaft 19 of the first drive roller 15 is rotatably supported by the upper frame 22 included in the frame 26 and does not move in the vertical direction Z perpendicular to the conveying direction M1. The first rotary shaft 23 of the first driven roller 16 is rotatably supported by the lower frame 25 included in the frame 26 and does not move in the vertical direction Z perpendicular to the conveying direction M1. Thus, with a simple configuration, the position of the conveyed card-like medium 2 is definable in the vertical direction Z with accuracy. In the same manner, the second drive shaft 29 of the second drive roller 27 is rotatably supported by the upper frame 22 and does not move in the vertical direction Z. The second rotary shaft 33 of the second driven roller 28 is rotatably supported by the lower frame 25 and does not move in the vertical direction Z. Thus, with a simple configuration, the position of the conveyed card-like medium 2 is definable in the vertical direction Z with accuracy.

Furthermore, the first drive roller 15 and the first driven roller 16, and the second drive roller 27 and the second driven roller 28 may be formed of the same material; thus, sharing of materials is possible, and it is economic. Furthermore, sharing of molds, jigs, and the like, used to manufacture the first drive roller 15, the first driven roller 16, the second drive roller 27, and the second driven roller 28 also reduces manufacturing costs of the scanner 1.

(Modification)

Furthermore, the first drive-roller main body 20 and the first driven-roller main body 24 may be formed of different elastic materials having different degrees of hardness and have different shapes from each other as long as the first drive-roller deformation amount of the first drive-roller main body 20 deformed in a direction away from the first driven-roller main body 24 is equal to the first driven-roller deformation amount of the first driven-roller main body 24 deformed in a direction away from the first drive-roller main body 20 when the pair of first conveyance rollers 13 nips the card-like medium 2. That is, a configuration may be such that the first drive roller 15 and the first driven roller 16 have the same degree of hardness in appearance.

Similarly, the second drive-roller main body 30 and the second driven-roller main body 34 may be formed of different elastic materials having different degrees of hardness and have different shapes from each other as long as the second drive-roller deformation amount of the second drive-roller main body 30 deformed in a direction away from the second driven-roller main body 34 is equal to the second driven-roller deformation amount of the second driven-roller main body 34 deformed in a direction away from the second drive-roller main body 30 when the pair of second conveyance rollers 14 nips the card-like medium 2. That is, a configuration may be such that the second drive roller 27 and the second driven roller 28 have the same degree of hardness in appearance.

Furthermore, the surfaces of the first drive-roller main body 20, the first driven-roller main body 24, the second drive-roller main body 30, and the second driven-roller main body 34 may be provided with an uneven pattern. This allows the pair of first conveyance rollers 13 and the pair of second conveyance rollers 14 to convey the card-like medium 2 without slip.

Furthermore, rotation of the conveyance motor 11 may be transmitted to the first driven roller 16. Moreover, rotation of the conveyance motor 11 may be transmitted to the second driven roller 28.

Second Embodiment

Figure 5:
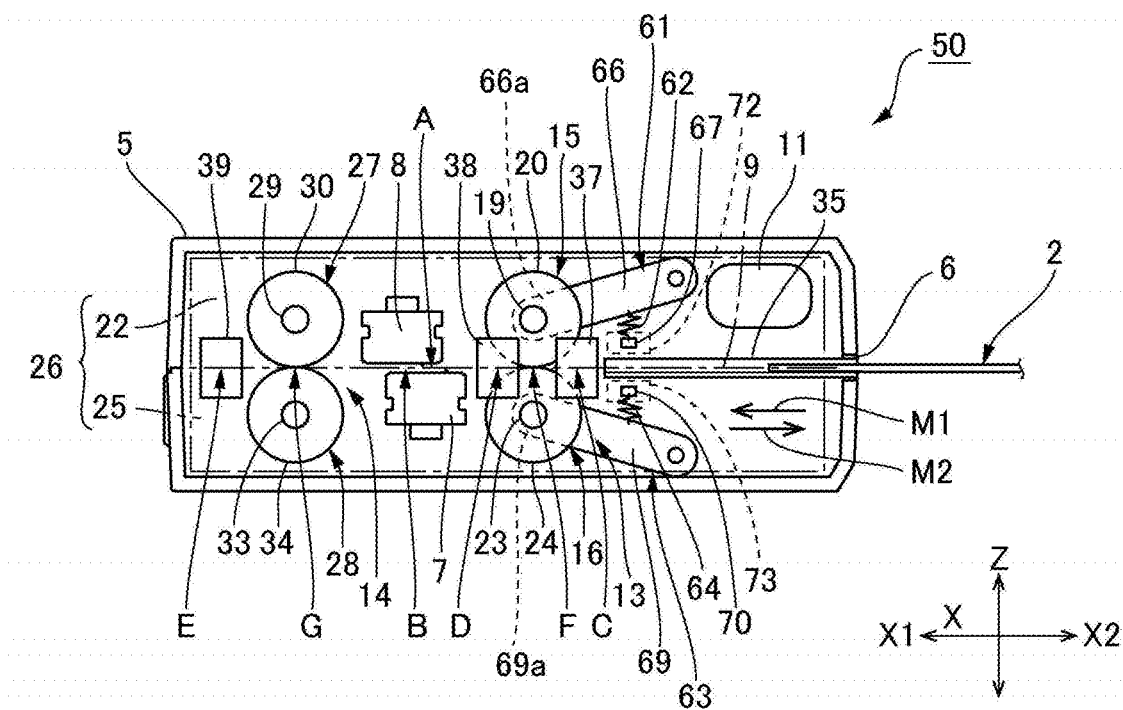
FIG. 5 is a longitudinal sectional view of an image reading device according to a second embodiment.

FIG. 5 is an explanatory diagram of a scanner according to a second embodiment. In a scanner 50 according to the present embodiment, the conveyance mechanism 10 includes: a first drive-roller moving mechanism 61 supporting the first drive roller 15 such that it is movable in a direction close to and away from the conveyance path 9; and a first drive-roller spring member 62 biasing the first drive roller 15 supported by the first drive-roller moving mechanism 61 toward the conveyance path 9. Furthermore, the conveyance mechanism 10 includes: a first driven-roller moving mechanism 63 (first opposing-roller moving mechanism) supporting the first driven roller 16 such that it is movable in a direction close to and away from the conveyance path 9; and a first driven-roller spring member 64 (first opposing-roller spring member) biasing the first driven roller 16 supported by the first driven-roller moving mechanism 63 toward the conveyance path 9. As other configurations are the same as those of the above-described scanner 1, the corresponding components are attached with the same reference numeral, and their explanations are omitted.

The first drive-roller moving mechanism 61 includes a first drive-roller arm 66 located above the conveyance path 9 and extending in the front-back direction X. The rear edge portion of the first drive-roller arm 66 is rotatably supported by the upper frame 22. Furthermore, the front edge portion of the first drive-roller arm 66 is provided with a first drive-roller supporting portion 66a rotatably supporting the first drive shaft 19. The first drive-roller spring member 62 is a coil spring expanding and contracting in the vertical direction Z, and it biases the first drive-roller arm 66 toward the conveyance path 9. The upper end of the coil spring is engaged with the first drive-roller arm 66, and the lower end thereof is engaged with a first upper engaging portion 67 provided in the upper frame 22 and under the first drive-roller arm 66.

The first driven-roller moving mechanism 63 includes a first driven-roller arm 69 located under the conveyance path 9 and extending in the front-back direction X. The rear edge portion of the first driven-roller arm 69 is rotatably supported by the lower frame 25. Furthermore, the front edge portion of the first driven-roller arm 69 is provided with a first driven-roller supporting portion 69a rotatably supporting the first rotary shaft 23. The first driven-roller spring member 64 is a coil spring expanding and contracting in the vertical direction Z, and it biases the first driven-roller arm 69 toward the conveyance path 9. Specifically, the lower end of the coil spring is engaged with the first driven-roller arm 69, and the upper end thereof is engaged with a first lower engaging portion 70 provided in the lower frame 25 and above the first driven-roller arm 69.

Here, the first drive-roller spring member 62 and the first driven-roller spring member 64 are the same type of coil spring. When the card-like medium 2 is not nipped, the first drive-roller main body 20 and the first driven-roller main body 24 are kept in contact due to the biasing force of the first drive-roller spring member 62 and the biasing force of the first driven-roller spring member 64. The contact position between the first drive-roller main body 20 and the first driven-roller main body 24 is on the conveyance path 9.

(Functional Advantage)

According to the present embodiment, when the pair of first conveyance rollers 13 feeds the card-like medium 2 to the first image read position A and the second image read position B, both the first drive roller 15 and the first driven roller 16 are movable in a direction away from the conveyance path 9. Furthermore, as the first drive-roller spring member 62 and the first driven-roller spring member 64 are the same type of coil spring, the movement amount of the first drive roller 15 and the movement amount of the first driven roller 16 when the pair of first conveyance rollers 13 nips the card-like medium 2 may be equal. Therefore, it is possible to avoid or control the movement of the center, in the thickness direction, of the card-like medium 2 in the thickness direction of the card-like medium 2 depending on the thickness of the conveyed card-like medium 2 when the card-like medium 2 is conveyed by the pair of first conveyance rollers 13. Furthermore, the force for nipping the card-like medium 2 between the first drive roller 15 and the first driven roller 16, i.e., the conveying force of the pair of first conveyance rollers 13, is adjustable by the first drive-roller spring member 62 and the first driven-roller spring member 64.

Modification of the Second Embodiment

According to the present embodiment, the first drive-roller spring member 62 (coil spring) and the first driven-roller spring member 64 (coil spring) may be serially connected. That is, the first drive-roller spring member 62 and the first driven-roller spring member 64 may be also formed of a single coil spring. In this case, the upper end of the coil spring is engaged with the first drive-roller arm 66, and the lower end thereof is engaged with the first driven-roller arm 69.

Furthermore, as illustrated by a dotted line in FIG. 5, the conveyance mechanism 10 may include: a first drive-roller biasing-force adjusting mechanism 72 that adjusts the biasing force of the first drive-roller spring member 62; and a first driven-roller biasing-force adjusting mechanism 73 (first opposing-roller biasing-force adjustment mechanism) that adjusts the biasing force of the first driven-roller spring member 64. Specifically, with the first drive-roller biasing-force adjusting mechanism 72, the first upper engaging portion 67 is a member separate from the upper frame 22. Furthermore, the first upper engaging portion 67 is supported by the upper frame 22 such that it is movable in the vertical direction Z. In other words, the first drive-roller biasing-force adjusting mechanism 72 includes the first upper engaging portion 67 supported by the upper frame 22 such that it is movable in the vertical direction Z, and the first upper engaging portion 67 is engaged with the lower end of the first drive-roller spring member 62 (coil spring) whose upper end is engaged with the first drive-roller arm 66. Furthermore, with the first driven-roller biasing-force adjusting mechanism 73, the first lower engaging portion 70 is a member separate from the lower frame 25. Moreover, the first lower engaging portion 70 is supported by the lower frame 25 such that it is movable in the vertical direction Z. In other words, the first driven-roller biasing-force adjusting mechanism 73 includes the first lower engaging portion 70 supported by the lower frame 25 such that it is movable in the vertical direction Z, and the first lower engaging portion 70 is engaged with the upper end of the first driven-roller spring member 64 (coil spring) whose lower end is engaged with the first driven-roller arm 69.

In this way, the biasing force of the first drive-roller spring member 62 for the first drive roller 15 is adjustable by moving the first upper engaging portion 67 in the vertical direction Z. Furthermore, the biasing force of the first driven-roller spring member 64 for the first driven roller 16 is adjustable by moving the first lower engaging portion 70 in the vertical direction Z. Thus, the force for nipping the card-like medium 2 between the first drive roller 15 and the first driven roller 16, i.e., the conveying force of the pair of first conveyance rollers 13, is adjustable in accordance with the thickness of the card-like medium 2 inserted into the conveyance path 9.

Third Embodiment

Figure 6:
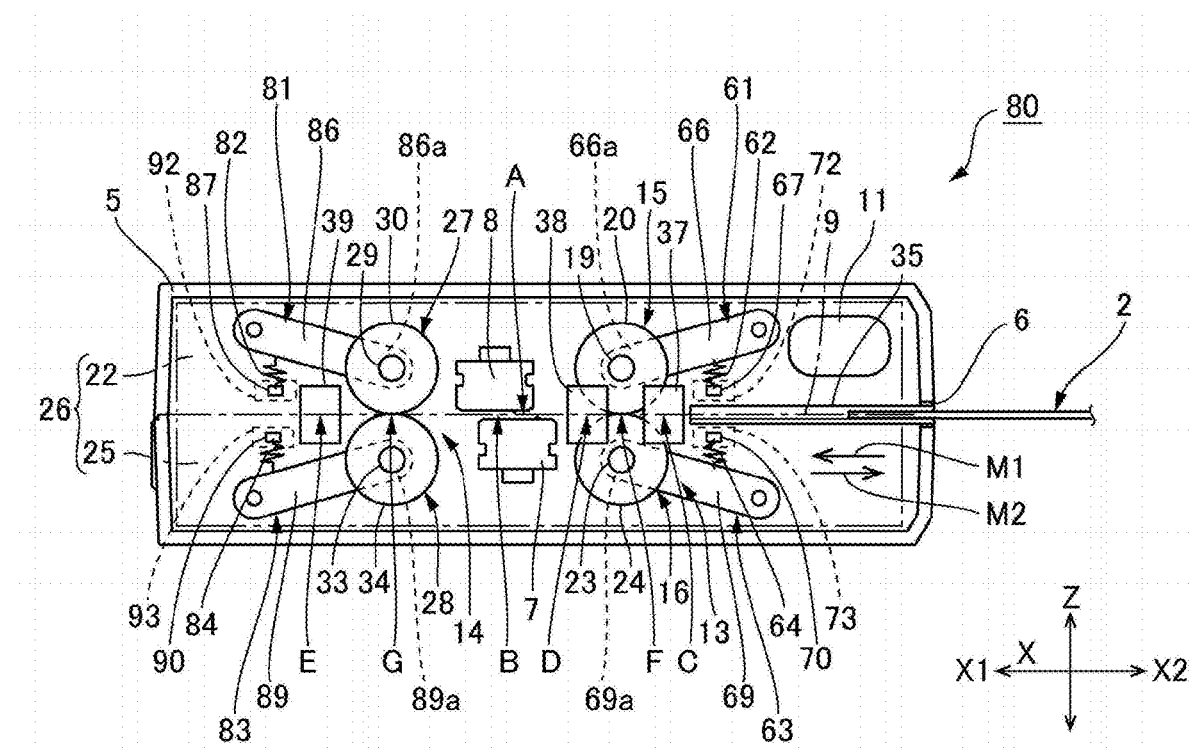
FIG. 6 is a longitudinal sectional view of an image reading device according to a third embodiment.

FIG. 6 is an explanatory diagram of a scanner according to a third embodiment. A scanner 80 according to the present embodiment includes, in addition to the conveyance mechanism 10 of the scanner 50 according to the second embodiment, a second drive-roller moving mechanism 81 that supports the second drive roller 27 such that it is movable in a direction close to and away from the conveyance path 9, and a second drive-roller spring member 82 that biases the second drive roller 27 supported by the second drive-roller moving mechanism 81 toward the conveyance path 9. Furthermore, it includes: a second driven-roller moving mechanism 83 (second opposing-roller moving mechanism) that supports the second driven roller 28 in a direction close to and away from the conveyance path 9; and a second driven-roller spring member 84 (second opposing-roller spring member) that biases the second driven roller 28 supported by the second driven-roller moving mechanism 83 toward the conveyance path 9. As other configurations of the scanner 80 according to the present embodiment are the same as those of the scanner 50 according to the second embodiment, corresponding components are attached with the same reference numeral, and their explanations are omitted.

The second drive-roller moving mechanism 81 includes a second drive-roller arm 86 located above the conveyance path 9 and extending in the front-back direction X. The front edge portion of the second drive-roller arm 86 is rotatably supported by the upper frame 22. The rear edge portion of the second drive-roller arm 86 is provided with a second drive-roller supporting portion 86a rotatably supporting the second drive shaft 29. The second drive-roller spring member 82 is a coil spring expanding and contracting in the vertical direction Z, and it biases the second drive-roller arm 86 toward the conveyance path 9. The upper end of the coil spring is engaged with the second drive-roller arm 86, and the lower end thereof is engaged with a second upper engaging portion 87 provided in the upper frame 22 and under the second drive-roller arm 86.

The second driven-roller moving mechanism 83 includes a second driven-roller arm 89 located under the conveyance path 9 and extending in the front-back direction X. The front edge portion of the second driven-roller arm 89 is rotatably supported by the lower frame 25. The rear edge portion of the second driven-roller arm 89 is provided with a second driven-roller supporting portion 89a rotatably supporting the second rotary shaft 33. The second driven-roller spring member 84 is a coil spring expanding and contracting in the vertical direction Z, and it biases the second driven-roller arm 89 toward the conveyance path 9. Specifically, the lower end of the coil spring is engaged with the second driven-roller arm 89, and the upper end thereof is engaged with a second lower engaging portion 90 provided in the lower frame 25 and above the second driven-roller arm 89.

The second drive-roller spring member 82 and the second driven-roller spring member 84 are the same type of coil spring. When the card-like medium 2 is not nipped, the second drive-roller main body 30 and the second driven-roller main body 34 are kept in contact due to the biasing force of the second drive-roller spring member 82 and the biasing force of the second driven-roller spring member 84. The contact position between the second drive-roller main body 30 and the second driven-roller main body 34 is on the conveyance path 9.

(Functional Advantage)

According to the present embodiment, when the pair of second conveyance rollers 14 feeds the card-like medium 2 to the first image read position A and the second image read position B, both the second drive roller 27 and the second driven roller 28 are movable in a direction away from the conveyance path 9. Furthermore, as the second drive-roller spring member 82 and the second driven-roller spring member 84 are the same type of coil spring, the movement amount of the second drive roller 27 and the movement amount of the second driven roller 28 when the pair of second conveyance rollers 14 nips the card-like medium 2 may be equal. Therefore, it is possible to avoid or control the movement of the center, in the thickness direction, of the card-like medium 2 in the thickness direction of the card-like medium 2 depending on the thickness of the conveyed card-like medium 2 when the card-like medium 2 is conveyed by the pair of second conveyance rollers 14. Furthermore, the force for nipping the card-like medium 2 between the second drive roller 27 and the second driven roller 28, i.e., the conveying force of the pair of second conveyance rollers 14, is adjustable by the second drive-roller spring member 82 and the second driven-roller spring member 84.

Modification of the Third Embodiment

According to the present embodiment, the second drive-roller spring member 82 (coil spring) and the second driven-roller spring member 84 (coil spring) may be serially connected. That is, the second drive-roller spring member 82 and the second driven-roller spring member 84 may be also formed of a single coil spring. In this case, the upper end of the coil spring is engaged with the second drive-roller arm 86, and the lower end thereof is engaged with the second driven-roller arm 89.

Furthermore, the first drive-roller arm 66 of the first drive-roller moving mechanism 61 and the second drive-roller arm 86 of the second drive-roller moving mechanism 81 may be integrally formed. In this case, a drive-roller arm that is an integration of the first drive-roller arm 66 and the second drive-roller arm 86 is supported by the upper frame 22 such that it is movable in the vertical direction Z. Then, the drive-roller arm is biased by a spring member such as a coil spring toward the conveyance path 9. In the same manner, the first driven-roller arm 69 of the first driven-roller moving mechanism 63 and the second driven-roller arm 89 of the second driven-roller moving mechanism 83 may be integrally formed. In this case, a driven-roller arm that is an integration of the first driven-roller arm 69 and the second driven-roller arm 89 is supported by the lower frame 25 such that it is movable in the vertical direction Z. Then, the driven-roller arm is biased by a spring member such as a coil spring toward the conveyance path 9. A configuration may be such that only any one of the drive-roller arm integrating the first drive-roller arm 66 and the second drive-roller arm 86 and the driven-roller arm integrating the first driven-roller arm 69 and the second driven-roller arm 89 is provided.

Furthermore, as indicated by a dotted line in FIG. 6, according to the present embodiment, the conveyance mechanism 10 may include: a second drive-roller biasing-force adjusting mechanism 92 that adjusts the biasing force of the second drive-roller spring member 82; and a second driven-roller biasing-force adjusting mechanism 93 (second opposing-roller biasing-force adjusting mechanism) that adjusts the biasing force of the second driven-roller spring member 84. Specifically, with the second drive-roller biasing-force adjusting mechanism 92, the second upper engaging portion 87 is a member separate from the upper frame 22. Furthermore, the second upper engaging portion 87 is supported by the upper frame 22 such that it is movable in the vertical direction Z. In other words, the second drive-roller biasing-force adjusting mechanism 92 includes the second upper engaging portion 87 supported by the upper frame 22 such that it is movable in the vertical direction Z, and the second upper engaging portion 87 is engaged with the lower end of the second drive-roller spring member 82 (coil spring) whose upper end is engaged with the second drive-roller arm 86. Furthermore, with the second driven-roller biasing-force adjusting mechanism 93, the second lower engaging portion 90 is a member separate from the lower frame 25. Moreover, the second lower engaging portion 90 is supported by the lower frame 25 such that it is movable in the vertical direction Z. In other words, the second driven-roller biasing-force adjusting mechanism 93 includes the second lower engaging portion 90 supported by the lower frame 25 such that it is movable in the vertical direction Z, and the second lower engaging portion 90 is engaged with the upper end of the second driven-roller spring member 84 (coil spring) whose lower end is engaged with the second driven-roller arm 89.

In this way, the biasing force of the second drive roller 27 by the second drive-roller spring member 82 is adjustable by moving the second upper engaging portion 87 in the vertical direction Z. Furthermore, the biasing force of the second driven roller 28 by the second driven-roller spring member 84 is adjustable by moving the second lower engaging portion 90 in the vertical direction Z. Thus, the force for nipping the card-like medium 2 between the second drive roller 27 and the second driven roller 28, i.e., the conveying force of the pair of second conveyance rollers 14, is adjustable in accordance with the thickness of the card-like medium 2 inserted into the conveyance path 9.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An image reading device for use with a medium, the image reading device comprising:
   a conveyance path through which a medium is conveyed;
   a conveyance mechanism configured to convey the medium along the conveyance path; and
   a first image sensor and a second image sensor that are disposed on both sides of the conveyance path with the conveyance path interposed therebetween, wherein
   the conveyance mechanism comprises:
      a driving source;
      a pair of first conveyance rollers located upstream of a first image read position of the first image sensor and a second image read position of the second image sensor in a conveying direction; and
      a pair of second conveyance rollers located downstream of the first image read position and the second image read position in the conveying direction,
   the pair of first conveyance rollers comprises:
      a first drive roller to which a driving force from the driving source is transmitted; and
      a first opposing roller that is opposed to the first drive roller with the conveyance path interposed therebetween,
   the pair of second conveyance rollers comprises:
      a second drive roller to which a driving force from the driving source is transmitted; and
      a second opposing roller opposed to the second drive roller with the conveyance path interposed therebetween,
   the first drive roller comprises a first drive-roller main body made of an elastic material,
   the first opposing roller comprises a first opposing-roller main body made of an elastic material and configured to nip the medium together with the first drive-roller main body,
   the second drive roller comprises a second drive-roller main body made of an elastic material,
   the second opposing roller comprises a second opposing-roller main body made of an elastic material and configured to nip the medium together with the second drive-roller main body,
   when the medium is nipped by the pair of first conveyance rollers, a first drive-roller deformation amount of the first drive-roller main body being elastically deformed in a direction away from the first opposing-roller main body is equal to a first opposing-roller deformation amount of the first opposing-roller main body being deformed in a direction away from the first drive-roller main body, and
   when the medium is nipped by the pair of second conveyance rollers, a second drive-roller deformation amount of the second drive-roller main body being elastically deformed in a direction away from the second opposing-roller main body is equal to a second opposing-roller deformation amount of the second opposing-roller main body being deformed in a direction away from the second drive-roller main body.

2. The image reading device according to claim 1, wherein
   a degree of hardness of the first drive-roller main body is equal to a degree of hardness of the first opposing-roller main body, and
   a shape of the first drive-roller main body is identical to a shape of the first opposing-roller main body.

3. The image reading device according to claim 2, wherein
   a degree of hardness of the second drive-roller main body is equal to a degree of hardness of the second opposing-roller main body, and a shape of the second drive-roller main body is identical to a shape of the second opposing-roller main body.

4. The image reading device according to claim 3, wherein a surface of the first drive-roller main body and a surface of the first opposing-roller main body are provided with unevenness.

5. The image reading device according to claim 4, further comprising a frame, wherein
the first drive roller comprises a first drive shaft around which the first drive-roller main body is coaxially secured,
the first opposing roller comprises a first rotary shaft around which the first opposing-roller main body is coaxially secured and which is disposed on an opposite side of the first drive shaft with the conveyance path interposed therebetween,
the second drive roller comprises a second drive shaft around which the second drive-roller main body is coaxially secured,
the second opposing roller comprises a second rotary shaft around which the second opposing-roller main body is coaxially secured and which is disposed on an opposite side of the second drive shaft with the conveyance path interposed therebetween, and
the first drive shaft, the first rotary shaft, the second drive shaft, and the second rotary shaft are rotatably supported by the frame.

6. The image reading device according to claim 5, wherein
the conveyance mechanism comprises:
a first drive-roller moving mechanism structured to support the first drive roller such that the first drive roller is movable in a direction close to and away from the conveyance path;
a first drive-roller spring member structured to bias the first drive roller supported by the first drive-roller moving mechanism toward the conveyance path;
a first opposing-roller moving mechanism structured to support the first opposing roller such that the first opposing roller is movable in a direction close to and away from the conveyance path; and
a first opposing-roller spring member structured to bias the first opposing roller supported by the first opposing-roller moving mechanism toward the conveyance path, and
when the medium is not nipped, the first drive-roller main body and the first opposing-roller main body are kept in contact due to a biasing force of the first drive-roller spring member and a biasing force of the first opposing-roller spring member.

7. The image reading device according to claim 6, wherein the first drive-roller spring member and the first opposing-roller spring member are of an identical material.

8. The image reading device according to claim 6, wherein the conveyance mechanism comprises a first drive-roller biasing-force adjusting mechanism that is configured to adjust a biasing force of the first drive-roller spring member and a first opposing-roller biasing-force adjusting mechanism that is configured to adjust a biasing force of the first opposing-roller spring member.

9. The image reading device according to claim 5, wherein
the conveyance mechanism comprises:
a second drive-roller moving mechanism structured to support the second drive roller such that the second drive roller is movable in a direction close to and away from the conveyance path;
a second drive-roller spring member structured to bias the second drive roller supported by the second drive-roller moving mechanism toward the conveyance path;
a second opposing-roller moving mechanism structured to support the second opposing roller such that the second opposing roller is movable in a direction close to and away from the conveyance path; and
a second opposing-roller spring member structured to bias the second opposing roller supported by the second opposing-roller moving mechanism toward the conveyance path, and
when the medium is not nipped, the second drive-roller main body and the second opposing-roller main body are kept in contact due to a biasing force of the second drive-roller spring member and a biasing force of the second opposing-roller spring member.

10. The image reading device according to claim 9, wherein the second drive-roller spring member and the second opposing-roller spring member are of an identical material.

11. The image reading device according to claim 9, wherein the conveyance mechanism comprises a second drive-roller biasing-force adjusting mechanism that is configured to adjust a biasing force of the second drive-roller spring member and a second opposing-roller biasing-force adjusting mechanism that is configured to adjust a biasing force of the second opposing-roller spring member.

12. The image reading device according to claim 1, wherein
a degree of hardness of the second drive-roller main body is equal to a degree of hardness of the second opposing-roller main body, and
a shape of the second drive-roller main body is identical to a shape of the second opposing-roller main body.

13. The image reading device according to claim 1, wherein a surface of the first drive-roller main body and a surface of the first opposing-roller main body are provided with unevenness.

14. The image reading device according to claim 1, further comprising a frame, wherein
the first drive roller comprises a first drive shaft around which the first drive-roller main body is coaxially secured,
the first opposing roller comprises a first rotary shaft around which the first opposing-roller main body is coaxially secured and which is disposed on an opposite side of the first drive shaft with the conveyance path interposed therebetween,
the second drive roller comprises a second drive shaft around which the second drive-roller main body is coaxially secured,
the second opposing roller comprises a second rotary shaft around which the second opposing-roller main body is coaxially secured and which is disposed on an opposite side of the second drive shaft with the conveyance path interposed therebetween, and
the first drive shaft, the first rotary shaft, the second drive shaft, and the second rotary shaft are rotatably supported by the frame.

15. The image reading device according to claim 1, wherein
the conveyance mechanism comprises:
a first drive-roller moving mechanism structured to support the first drive roller such that the first drive roller is movable in a direction close to and away from the conveyance path;

a first drive-roller spring member structured to bias the first drive roller supported by the first drive-roller moving mechanism toward the conveyance path;

a first opposing-roller moving mechanism structured to support the first opposing roller such that the first opposing roller is movable in a direction close to and away from the conveyance path; and a first opposing-roller spring member structured to bias the first opposing roller supported by the first opposing-roller moving mechanism toward the conveyance path, and when the medium is not nipped, the first drive-roller main body and the first opposing-roller main body are kept in contact due to a biasing force of the first drive-roller spring member and a biasing force of the first opposing-roller spring member.

16. The image reading device according to claim 15, wherein the first drive-roller spring member and the first opposing-roller spring member are of an identical material.

17. The image reading device according to claim 15, wherein the conveyance mechanism comprises a first drive-roller biasing-force adjusting mechanism that is configured to adjust a biasing force of the first drive-roller spring member and a first opposing-roller biasing-force adjusting mechanism that is configured to adjust a biasing force of the first opposing-roller spring member.

18. The image reading device according to claim 1, wherein the conveyance mechanism comprises:

a second drive-roller moving mechanism structured to support the second drive roller such that the second drive roller is movable in a direction close to and away from the conveyance path;

a second drive-roller spring member structured to bias the second drive roller supported by the second drive-roller moving mechanism toward the conveyance path;

a second opposing-roller moving mechanism structured to support the second opposing roller such that the second opposing roller is movable in a direction close to and away from the conveyance path; and a second opposing-roller spring member structured to bias the second opposing roller supported by the second opposing-roller moving mechanism toward the conveyance path, and when the medium is not nipped, the second drive-roller main body and the second opposing-roller main body are kept in contact due to a biasing force of the second drive-roller spring member and a biasing force of the second opposing-roller spring member.

19. The image reading device according to claim 18, wherein the second drive-roller spring member and the second opposing-roller spring member are of an identical material.

20. The image reading device according to claim 18, wherein the conveyance mechanism comprises a second drive-roller biasing-force adjusting mechanism that is configured to adjust a biasing force of the second drive-roller spring member and a second opposing-roller biasing-force adjusting mechanism that is configured to adjust a biasing force of the second opposing-roller spring member.

* * * * *